United States Patent

Fricke, Jr.

[15] 3,696,304

[45] Oct. 3, 1972

[54] PROPORTIONAL ONLY PROCESS CONTROLLER

[72] Inventor: Louis H. Fricke, Jr., St. Louis, Mo.

[73] Assignee: Monsanto Company, St. Louis, Mo.

[22] Filed: June 29, 1970

[21] Appl. No.: 50,489

[52] U.S. Cl. .................... 330/30 D, 330/69, 330/1 A
[51] Int. Cl. ............................................. H03f 3/68
[58] Field of Search ............... 330/30 D, 69; 307/230

[56] References Cited

UNITED STATES PATENTS

| 3,467,874 | 9/1969 | Richardson et al. ..330/30 D X |
| 3,564,444 | 2/1971 | Walsh ...................... 330/30 D |
| 3,434,069 | 3/1969 | Jones ....................... 330/30 D |

Primary Examiner—Nathan Kaufman
Attorney—John D. Upham, Harold R. Patton

[57] ABSTRACT

Automatic process controller circuitry for producing an output current which is proportional to a process variable input signal. A differential operational amplifier is connected to receive set point and process variable input signals and provides an output voltage which is proportional to the difference between these two signals. An adjustable proportional band series output impedance is connected between the output of the operational amplifier and a controller circuit output node, and this series impedance converts the output voltage of said amplifier to a current. The voltage developed across this variable series output impedance is differentially fed back via positive and negative feedback loops to the inverting and noninverting inputs of the operational amplifier, and such feedback connection enables the proportional current flowing through the variable series output impedance to be made constant and independent of the output voltage of the operational amplifier. Also, since the load current flowing in the transducer driven by the above controller circuitry can be made equal or proportional to this proportional current, said load current can be adjusted to a value wholly independent of the internal resistance of the driven transducer.

4 Claims, 2 Drawing Figures

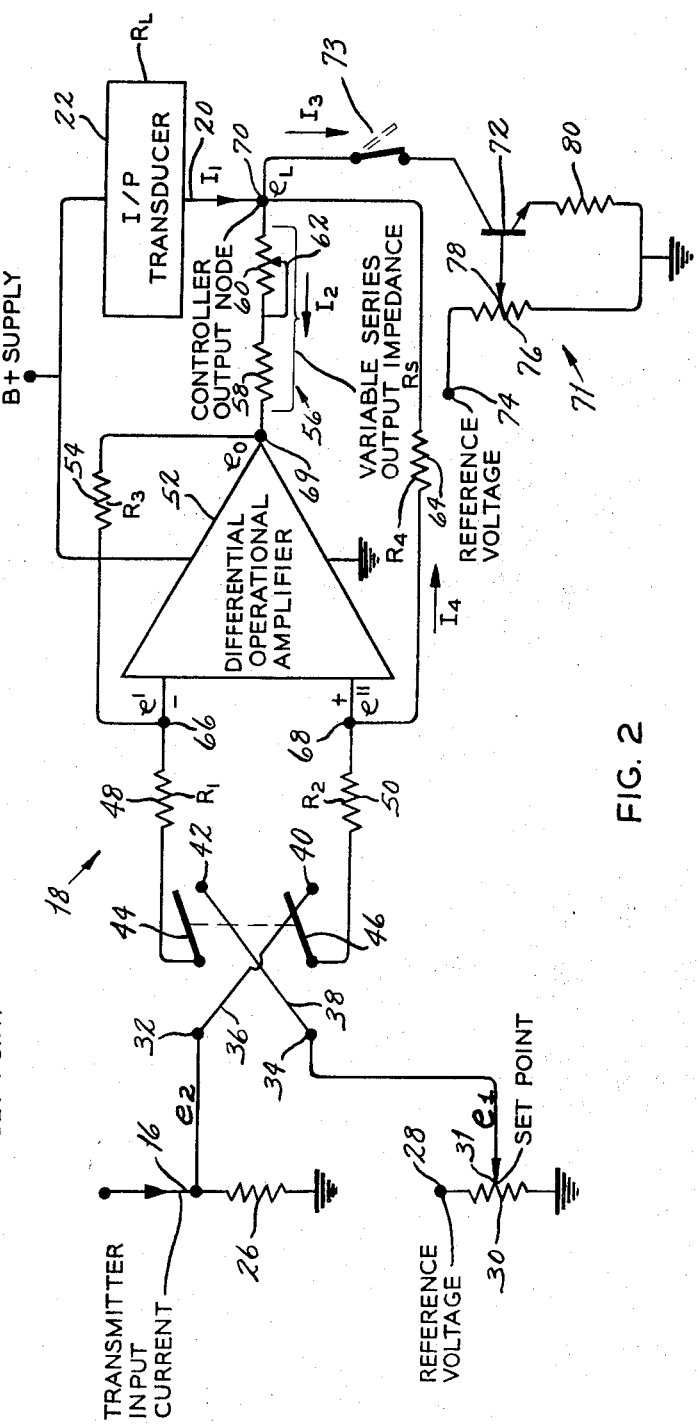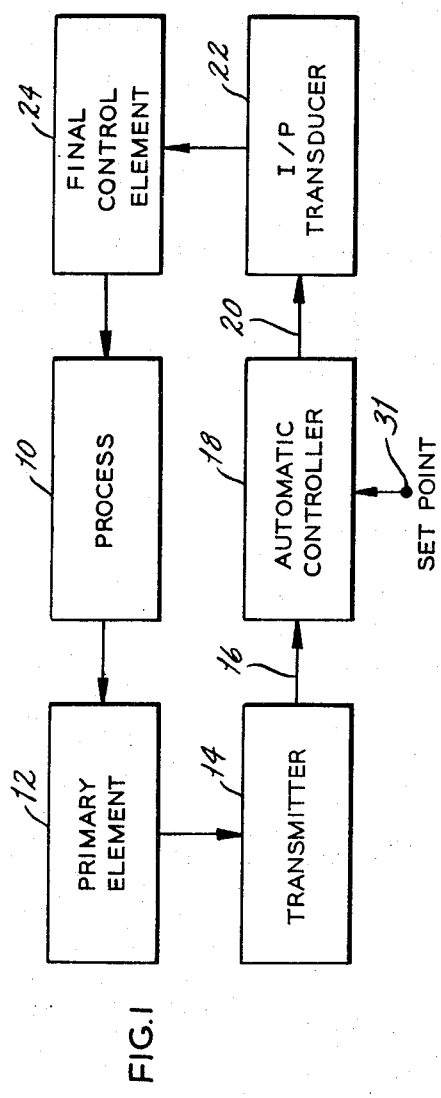
FIG. 2
FIG. 1
INVENTOR
LOUIS H. FRICKE, JR.
BY
William J Bethurum
ATTORNEY

PROPORTIONAL ONLY PROCESS CONTROLLER

FIELD OF THE INVENTION

This invention relates generally to automatic process controllers and more particularly to a "proportional only" automatic process controller having improved adjustable proportional band output current characteristics.

BACKGROUND OF THE INVENTION

There are many closed loop servo-type systems for controlling different variables of a process, and such systems normally include apparatus mounted in the process being controlled for measuring a selected process variable (PV). This process variable is then translated into a corresponding electrical signal and transmitted to a main process controller where it is compared to a known adjustable set point reference signal. By such comparison, an error signal is generated at the output of the controller, and this error signal is in turn utilized to drive a current-to-pressure (I/P) transducer in the closed loop. This I/P transducer actuates a final control element, such as a pneumatic valve, and this valve controls a selected parameter of the process, such as the process flow rate. By this closed loop feedback control, an undesirable deviation in a process parameter may be reduced or eliminated.

In a proportional controller, the electrical characteristics of the controller, such as the gain constants, etc., are selected such that a selected percentage of the process variable input signal range will correspond to a different selected percentage of the range of controller output currents or voltages. The relationship of these two percentages is referred to as the proportional band of the controller, abbreviated P.B. The proportional band P.B. is defined as $$P.B. = 100/G$$

where $G$ equals the gain of the controller. Thus, if the full range of process variable input currents (from a transmitter) is from 10 milliamperes to 50 milliamperes or a 40 milliampere range, and it is desired that a deviation of 20 milliamperes within this process variable input range correspond to a full range (100 percent) of the controller output current range, then the controller must have a gain $G$ of 2 and a proportional band of 50 percent. Typical proportional bands of present day proportion controllers range from 1 to 1,000.

DESCRIPTION OF THE PRIOR ART

Heretofore, in the construction of automatic process controllers, a common practice has been to use high gain operational amplifiers in the controller circuitry to provide good amplification and sensitivity for the error signal generated by comparing the process variable and set point reference voltages within the controller. With the advent of integrated circuits (ICS), the multistage IC operational amplifier became particularly attractive for use in process controllers as will be appreciated by those skilled in the art. However, due to the fact that process controllers of the above type must be capable of driving many different types of transducers with widely varying internal resistances, it became necessary to design the operational amplifier and other associated controller circuitry so that the controller output current is independent of the internal resistance of the driven transducer. That is, it is desired that the controller's output current be only dependent in some adjustable proportion to the variations in the process variable input signal, and independent of the internal resistance of the driven transducer.

In order to provide this output or transducer load current characteristic, one prior art process controller circuit utilizes an operational amplifier and one or more constant current sink output transistors connected to the output of the operational amplifier and grounded through a fixed resistor. By providing a resistive feedback connection between the grounded resistor and one input of the operational amplifier, it was possible to provide a controller output current which was substantially independent of the internal resistance of the driven transducer.

The resistive feedback connection mentioned above required that both the feedback signal and the error signal be applied to one of the differential input terminals of the operational amplifier and that its other differential input terminal be connected to ground. The latter requirement necessitated the use of a separate differential amplifier stage connected intermediate the above operational amplifier and the set point and process variable input signals for the controller. This additional differential amplifier stage was used to generate the error signal which was then applied along with feedback signal to one input terminal of the output operational amplifier.

Alternatively, and in place of the second differential amplifier stage mentioned above, a separate D.C. power supply could be connected between the process variable input terminal for the controller and the output operational amplifier stage for generating the required set point signal to be summed with the process variable input electrical signal. In either case above, however, one of these two additional electronic components was required at the input of the output operational amplifier stage where the latter was connected with resistive feedback as previously described.

SUMMARY OF THE INVENTION

The general purpose of this invention is to provide a proportional band controller which possesses all of the advantages of similarly employed prior art process controllers, but does not require either the combination of separate, cascaded amplifier stages or a single amplifier stage and a power supply in series therewith to maintain a constant controller output current for driving a transducer. To attain this, the present invention utilizes a unique output impedance and feedback connection for a single differential operational amplifier. This novel connection according to the present invention permits the single differential operational amplifier of the controller to differentially receive both set point and process variable electrical signals, thereby eliminating the need for either a separate differential amplifier stage for generating an error signal or a separate power supply for generating a set point signal.

Accordingly, an object of the present invention is to provide a new and improved automatic process controller having an adjustable proportional band.

Another object of this invention is to provide a new and improved automatic "proportional only" controller utilizing a single differential operational amplifier which produces a constant, adjustable output proportional band current. This current is independent of either the internal resistance of the driven transducer or the output voltage of the operational amplifier.

A further object of this invention is to provide a new and improved automatic proportional band process controller which is simple and easy to construct, relatively low in cost and reliable in operation.

Briefly, the automatic controller according to the present invention includes an operational differential amplifier having a variable series output impedance for converting the output voltage of the operational amplifier to a current which is proportional to a process variable input signal. The voltage developed across this variable series output impedance is differentially fed back to the inputs of the operational amplifier via positive and negative feedback loops, so that the proportional output current of the controller is independent of the internal impedance of the transducer driven by the controller and independent of the absolute value of the output voltage of the operational amplifier. An adjustable current source is connected to a controller output node and may be variably biased in accordance with the desired D.C. bias current for the controller's output load (transducer) current range.

DRAWINGS

FIG. 1 is a functional block diagram of the process control closed-loop system utilizing the present invention, and FIG. 2 is a schematic diagram representation of a circuit embodiment of the proportional band controller according to the present invention.

DETAILED DESCRIPTION OF THE INVENTION

Referring to FIG. 1, there is shown functionally a process 10 in which a process variable parameter, such as a flow rate, is being controlled. A primary element 12 responds to the process variable being controlled and provides an electrical input signal to a transmitter 14. The transmitter 14 develops a desired range of process variable input currents or voltages which are applied via conductor 16 to the automatic process controller 18. The automatic process controller 18 compares the process variable input signal on conductor 16 with a fixed set point reference potential applied to terminal 31, and as a result of such comparison, generates an output error signal on conductor 20. This output error signal may either be a current or a voltage, depending upon the requirements of the transducer stage 22 driven by that automatic controller 18. In the embodiment of the invention to be subsequently described, the automatic controller 18 output signal via line 20 is a load current which is converted to a pressure in the I/P transducer stage 22. This pressure is in turn used to control the final control element 24, such as a control valve (not shown). The final control element 24 returns the measured parameter of the process 10 to a desired value or range as is well-known in the process control art.

The automatic controller 18 in FIG. 1 is illustrated in schematic detail in FIG. 2 and is embodied as a proportional band controller whose output current $I_1$ is proportional to the process variable input current flowing in line 16. That is, a full range of output current $I_1$ flowing from transducer 22 into the controller output node 70 is proportional to a selected percentage of the full range of transmitter input current flowing through input conductor 16. The transducer 22 and controller 18 can be powered by the single B+ supply connected at supply terminal 23 or separate supplies (not shown).

The transmitter input current flows through an input resistor 26 and develops thereacross a process variable input voltage. This process variable input voltage is compared in the controller 18 to a set point voltage derived at variable tap 31 on the set point resistor 30. The process variable and set point voltages which are available at terminals 32 and 34, respectively, may be switched through the reversible switch connections 36 and 38 to the respective terminals 40 and 42 in the controller circuitry. Upon moving switches 44 and 46 to their closed position as shown in FIG. 2, the set point voltage at terminal 42 is converted to a set point reference current by a first input resistor 48 and is applied to a first input terminal 66 of the differential operational amplifier 52. Upon closure of switch 46, a second input resistor 50 converts the process variable input voltage at terminal 40 to a process variable current which is applied to a second input terminal 68 of the operational amplifier 52. The letter designations $R_1$ and $R_2$ for the first and second input resistors 48 and 50, respectively, the other resistor letter designations $R_3$, $R_4$, $R_s$, and the signal voltage designations $e_1$, $e_{24}$, $e'$, $e''$, $e_o$, and $e_L$, will be discussed in a subsequent portion of the specification This subsequent portion of the specification is directed to the operation of the controller circuit 18 with the current source switch 73 open and the current $I_3$ equal to zero. The description of such connection and associated circuit operation will clearly establish the relationship between transducer 22 load current and the differential input voltages $e'$ and $e''$ at terminals 66 and 68 respectively.

These first and second input terminals 66 and 68 are referred to as the inverting and noninverting inputs of the amplifier 52, and this amplifier 52 may advantageously take the form of an integrated circuit operational amplifier. The operational amplifier 52 may be readily selected from many commercially available types of operational amplifiers, and a typical integrated circuit operational amplifier 52, the following detailed portions of which are not shown in the drawing, often includes a first differential amplifier stage that provides most of the amplifier circuit gain. An intermediate differential stage is usually included to provide some additional gain where such is required, and a DC level shifting or level translating stage is commonly connected to the output of the intermediate stage to remove undesired DC components which are introduced into the amplified signal in two preceding stages. An output current amplifier stage is typically connected to this translating stage to provide the required output voltage swings and the required output current drive capability for the operational amplifier. For improved frequency compensation, external capacitors are frequently connected between stages or to individual transistors in a single stage of the operational amplifier 52.

The operational amplifier 52 provides an output voltage $e_o$ at its output terminal 69 which varies in proportion to the very small voltage difference between the input voltages $e'$ and $e''$ at the terminals or connections 68 and 66, respectively. This output voltage $e_0$ at terminal 69 is fed back via a first feedback resistor 54 to the first amplifier input terminal 66. A variable series output impedance 56, which includes a fixed resistor 58 and a variable shunted resistor 60, converts this output voltage $e_0$ at terminal 69 to an output current, $I_2$, which flows from a circuit output node 70. A second feedback resistor 64 is connected between the output node 70 and the second amplifier input terminal 68, and the ohmic values of the first and second feedback resistors 54 and 64 and the first and second input resistors 48 and 50, respectively, set the gain of the amplifier 52 as is well known and understood by those skilled in the art. In the embodiment of the present invention illustrated in FIG. 2 which has been built and successfully operated, feedback resistors 54 and 64 are equal in ohmic value and input resistors 48 and 50 are equal in ohmic value.

The set point current which flows through the first input resistor 48 develops a very small voltage $e'$ with respect to ground in the fraction of a millivolt range at a first input terminal 66 of the differential operational amplifier 52. Similarly, the process variable current flowing through the second input resistor 50 develops a very small input voltage $e''$ at a second input terminal 68 of the operational amplifier 52, and the difference between these very small input voltages $e'$ and $e''$ is amplified in the operational amplifier 52. Since the input currents flowing into the operational amplifier 52 from input terminals 66 and 68 are negligible, the direction of the current through the first feedback resistor 54 is from terminal 66, through feedback resistor 54 and into the amplifier output node 69. Similarly, the process variable current which flows through the second input resistor 50 also flows from terminal 68, through the second feedback resistor 64, into the controller circuit output node 70, through the variable output impedance 56 and to the amplifier output node 69. Neglecting the very small value of load current $I_1$ for large transducer loads, the current $I_2$ flowing in the variable series output impedance 56 is approximately proportional to the difference between the positive and negative feedback voltages applied via the first and second feedback resistors 54 and 64 in the respective positive and negative feedback loops to the input terminals 66 and 68 of the operational amplifier 52. Therefore, it is seen that the proportional current $I_2$ is substantially independent of the absolute value of the output voltage $e_0$ at the operational amplifier output node 69. By simply adjusting the variable tap 62 on the potentiometer 60, the value of the variable series output impedance 56 may be varied so that $I_2$ will vary in any desired proportion to variations in the transmitter input current flowing in conductor 16. The small fixed resistor 58 is included in the variable output impedance 56 as a safety precaution to prevent the potentiometer tap 62 from removing all series output resistance at the output node 69 of the operational amplifier 52.

For a further understanding of the proportional band operation of the process controller 18 according to the present invention, consider typical input current values for the transmitter input current ranging from 4 milliamperes to 20 milliamperes, or a range of 16 milliamperes. Therefore, 16 milliamperes represents 100 cent of the input current range for the controller. If it is desired that this 16 milliamperes or a full range of input currents correspond to a 1–5 volt range of output voltages developed across variable series output impedance 56, then in accordance with Ohms law, the variable output resistor 60 should be adjusted (neglecting the small fixed resistor 58 which is typically on the order of 10 ohms) to approximately 250 ohms. The above current and voltage values correspond to a proportional band of 100 percent and a gain of 1.

On the other hand, if it is desired to operate the controller 18 with a proportional band PB of 25, then 100 milliamperes of current $I_2$ would correspond to 1 volt drop across the variable output impedance 56. In the latter example, the variable output impedance would have to be adjusted to $1/100 \times 10^{-3}$ or approximately 10 ohms.

Frequently, it is desired that the output transducer current $I_1$ of the controller 18 be biased around an operating point; that is, the value of the output current $I_1$ flowing into the circuit output node 70 be adjusted equal to some constant, $K + I_2$. This is accomplished in accordance with the present invention by the use of an adjustable current source 71, including a transistor 72 which is connected through a base bias resistor 76 to a reference voltage terminal 74. A current limiting resistor 80 interconnects the emitter of the NPN current source transistor 72 to ground potential. By varying the position of the movable base tap 78 on resistor 76, the operating bias for transistor 72 may be changed to either increase of decrease the value of transistor collector current $I_3$ which is the constant K in the above question. In this manner, the midpoint or bias point within the current range for $I_1$ may be conveniently varied independently of the proportional band variation of $I_1$ as previously described.

It has been stated above and will be mathematically proven below that the current $I_2$ flowing in the series output impedance 62 (or $R_s$) is proportional to the difference between the set point and process variable input signals $e_1$ and $e_2$. Additionally, it will be shown that the current $I_2$ is approximately equal to the transducer load current $I_1$ when the current source current $I_3$ is equal to zero with switch 73 open.

If $e_1$ is defined as the set point signal voltage between input terminal 42 and ground, and $e_2$ is defined as the process variable signal voltage between input terminal 40 and ground, then, by superposition, $e'$ may be defined as $$e' = \left[\frac{R_3}{R_1+R_3}\right]e_1 + \left[\frac{R_1}{R_1+R_3}\right]e_0 \quad \text{(Eq. 1)}$$

and $e''$ may be written as $$e'' = \left[\frac{R_4}{R_2+R_4}\right]e_2 + \left[\frac{R_2}{R_2+R_4}\right]e_L \quad \text{(Eq. 2)}$$

Where $e_l$ is the voltage at the circuit output node 70. If the gain of the operational amplifier 52 is defined as a constant A, then the output voltage $e_0$ at node 69 may be written as $$e_0 = A(e'' - e') \quad \text{(Eq. 3)}$$

Combining equations 1 and 2 above, the value $e' - e''$ for the amplified differential voltage may be expressed as $$e' - e'' = \left[\frac{R_3}{R_1+R_3}\right]e_1 - \left[\frac{R_4}{R_2+R_4}\right]e_2$$
$$+ \left[\frac{R_1}{R_1+R_3}\right]e_o - \left[\frac{R_2}{R_2+R_4}\right]e_L$$
(Eq. 4)

Substituting $e_o/A$ for the quantity $(e''-e')$ (Equation 3 above), the output voltage $e_o$ at node 69 may be written as $$e_o = -A\left[\frac{R_3}{R_1+R_3}e_1 - \frac{R_4}{R_2+R_4}e_2\right]$$
$$- A\left[\frac{R_1}{R_1+R_3}e_o - \frac{R_2}{R_2+R_4}e_L\right]$$
(Eq. 5)

By factoring Eq. 5 above, the following expression results $$e_o\left[1 + \frac{AR_1}{R_1+R_3}\right] - e_L\left[\frac{AR_2}{R_2+R_4}\right]$$
$$= e_2\left[\frac{AR_4}{R_2+R_4}\right] - e_1\left[\frac{AR_3}{R_1+R_3}\right]$$
(Eq. 6)

If both sides of Eq. 6 above are divided by the gain $A$ of the operational amplifier 52, then equation 6 above may be modified as $$e_o\left[\frac{1}{A} + \frac{R_1}{R_1+R_3}\right] - e_L\left[\frac{R_2}{R_2+R_4}\right]$$
$$= e_2\left[\frac{R_4}{R_2+R_4}\right] - e_1\left[\frac{R_3}{R_1+R_3}\right]$$
(Eq. 7)

If the gain $A$ of the operational amplifier 52 is very high, in the order of $4 \times 10^4$ for example, then $1/A$ is approximately 0. If $1/A$ is assumed to be equal to 0 for present purposes, then Eq. 7 above may be modified as $$e_o\left[\frac{R_1}{R_1+R_3}\right] - e_L\left[\frac{R_2}{R_2+R_4}\right] = e_2\left[\frac{R_4}{R_2+R_4}\right] - e_1\left[\frac{R_3}{R_1+R_3}\right]$$
(Eq. 8)

If the resistors $R_1$, $R_2$, $R_3$ and $R_4$ are equal, then equation 8 may be written as $\frac{1}{2}(e_o - e_L) = \frac{1}{2}(e_2 - e_1)$ or
$(e_o - e_L) = (e_2 - e_1)$ (Eq. 9)

Therefore, from Eq. 9 above, it will be seen that the voltage $(e_o - e_L)$ developed across the series output impedance 56 is equal to the difference between the set point and process variable input signals $e_1$ and $e_2$.

If, for example, $R_3 = R_4 = 10R_1 = 10R_2$, then Eq. 9 may be modified above as $1/11 (e_o - e_L) = 10/11 (e_2 - e_1)$ or $(e_o - e_L) = 10(e_2 - e_1)$
(Eq. 10)

Thus, in accordance with the examplary Eq. 10 above, the voltage difference across the series output impedance 56 can be adjusted to a value 10 times the difference between input signals $e_2$ and $e_1$ and this changes the proportional band (PB) range by a factor of 10.

From Eq. 10 above, it will be understood that a general expression for input and output voltage relationships for the controller 18 can be written as $$e_o - e_L = K'(e_2 - e_1)$$
(Eq. 11)

where $K'$ is the proportional band range of the controller and is equal to $R_4/R_2$ and $R_3/R_1$.

The proportional current $I_2$ can now be defined as $$I_2 = \frac{e_o - e_L}{R_s} = \frac{K'(e_2 - e_1)}{R_s}$$
(Eq. 12)

where $R_s$ is the series resistance of the series output impedance 56.

If the feedback resistor $R_4$ is much greater than $R_s$ (i.e. $R_4 >> R_s$), then the feedback current $I_4$ through resistor $R_4$ is a negligible fraction of the load current $I_2$. For example, $R_4$ is typically 200 Kilohms whereas $R_s$ ranges typically from 100 ohms to 250 ohms. Therefore, $I_4$ may be in the order of $1/1,000\, I_2$. Thus, neglecting $I_4$, and assuming that $I_2 \approx I_1$, with the switch 73 open, then the relationship between the transducer load current $I_1$ and the set point and process variable input voltages $e_1$ and $e_2$ may be expressed as $$I_1 \approx \frac{K'(e_2 - e_1)}{R_s}$$
(Eq. 13)

which is the total gain equation for the controller 18 with the switch 73 open as previously described. And, as described in detail hereinabove, $R_s$ is made adjustable to provide fine proportional control of the load current $I_1$, and $K'$ can be varied by changing the input and feedback resistors $R_1$, $R_2$, $R_3$ and $R_4$ to change the proportional band range of the controller 18.

Various modifications may be made to the embodiment of the present invention illustrated in FIG. 2 without departing from the true scope of the invention. For example, various types of current sources which provide a constant and adjustable current $I_3$ may be substituted for the current source 71 without departing from the true scope of this invention. Similarly, the ratio of the feedback and input resistors for amplifier 52 may be changed as previously mentioned to vary the gain of the differential operational amplifier 52 within the scope of the present invention.

The following table includes ohmic values for the resistor components used in a circuit of the type described which has been built and successfully operated in the closed loop process environment for which it is intended. However, said table should not be construed as limiting the scope of this invention.

TABLE

| COMPONENTS | VALUE OR TYPE |
| --- | --- |
| Resistor 26 | 250 ohms |
| 31 | 1 kilohm |
| 48 | 200 kilohms |
| 50 | 200 kilohms |
| 54 | 200 kilohms |
| 58 | 10 ohms |
| 60 | 2500 ohms |
| 64 | 200 kilohms |
| 76 | 1 kilohm |
| 80 | 250 ohms |
| B+ Supply Voltage | 24 to 30 volts |

I claim:
1. A process controller for producing an output current proportional to changes in a process variable input signal applied thereto, including in combination:
  a. input circuit means for receiving process variable and set point input signals,
  b. differential amplifier means having first and second input terminals thereof connected to said input circuit means for differentially receiving and amplifying said process variable and set point input signals,
  c. a series output resistance connected between an output terminal of said differential amplifier means and an output circuit node, d. a first conductive feedback path connected to one point on said output resistance and between said output terminal of said differential amplifier means and said first input terminal thereof, and e. a second conductive feedback path connected between another point on said series output resistance and said second input terminal of said differential amplifier means, so that the voltage differentially fed back to said first and second input terminals of said differential amplifier means is that voltage developed between said first and second points on said series output resistance, whereby the proportional output current flowing through said series output resistance and through said output circuit node is independent of the internal impedance of the transducer connected to said output circuit node and driven by said controller, and is further independent of the absolute value of the output voltage at said output terminal of said differential amplifier means.

2. The controller defined in claim 1 wherein:

a. said first conductive path includes a first feed-back resistor connected between said output terminal of said differential amplifier means and said first input terminal thereof, b. said second conductive feedback path includes a second feedback resistor connected between said circuit output node and said second input terminal of said differential amplifier means, said input circuit means further includes, c. a first input resistor connected between a set point input terminal and said first input terminal of said differential amplifier means, and d. a second input resistor connected between a process variable input terminal and said second input terminal of said differential amplifier means, whereby said first and second input terminals of said differential amplifier means serve as first and second summing junctions, respectively, for said set point and process variable input signals, and the ratio of said first input resistor to said first feedback resistor and the ratio of said second input resistor to said second feedback resistor establishes the proportional band current range of said controller.

3. The controller defined in claim 2 wherein said series output impedance includes a fixed resistor portion and a variable resistor portion, so that current flowing through said series output impedance may be varied in accordance with the desired proportional band output current flowing into said circuit output node.

4. The controller defined in claim 1 which further includes an adjustable constant current source connected between said circuit output node and a point of reference potential, said constant current source conducting a current approximately equal to the difference between the current flowing into said circuit output node and the current flowing through said series output resistance to thereby permit adjustment of the output D.C. bias current flowing into said output circuit node from the stage driven thereat by said controller.

* * * * *